United States Patent [19]
Dobler et al.

[11] Patent Number: 6,038,496
[45] Date of Patent: Mar. 14, 2000

[54] VEHICLE WITH OPTICAL SCANNING DEVICE FOR A LATERAL ROAD AREA

[75] Inventors: Günter Dobler, Altbach; Siegfried Rothe, Denkendorf; Peter Betzitza, Sindelfingen; Markus Hartlieb, Waldorfhäslach, all of Germany

[73] Assignee: DaimlerChrysler AG, Germany

[21] Appl. No.: 08/611,658

[22] Filed: Mar. 6, 1996

[30] Foreign Application Priority Data

Mar. 7, 1995 [DE] Germany .......................... 195 07 957

[51] Int. Cl.$^7$ .................................................. G06F 17/00
[52] U.S. Cl. .................. 701/3; 701/10; 701/72; 701/223; 340/436; 340/438; 340/905; 250/559.06
[58] Field of Search ................ 701/3, 9, 10, 71, 701/72, 209, 223, 225, 301; 340/904, 905, 438, 436; 250/202, 222.2, 224, 559.06, 559.08, 559.03

[56] References Cited

U.S. PATENT DOCUMENTS

| | | | |
|---|---|---|---|
| 3,214,593 | 10/1965 | Killpatrick . | |
| 3,708,668 | 1/1973 | Tilley | 250/202 |
| 4,348,652 | 9/1982 | Barnes et al. | 340/904 |
| 4,630,109 | 12/1986 | Barton | 701/28 |
| 4,970,653 | 11/1990 | Kenue | 701/301 |
| 5,192,856 | 3/1993 | Schaham | 235/462.24 |
| 5,314,307 | 5/1994 | Shaw et al. | 701/71 |
| 5,805,275 | 9/1998 | Taylor | 180/167 |

FOREIGN PATENT DOCUMENTS

| | | |
|---|---|---|
| 0 049 722 A1 | 4/1982 | European Pat. Off. . |
| 2 679 357 A1 | 7/1991 | France . |
| 32 40 498 A1 | 5/1984 | Germany . |
| 33 00 086 | 7/1984 | Germany . |
| 38 27 729 | 3/1990 | Germany . |
| 41 10 132 A1 | 10/1991 | Germany . |
| 59-46570 | 3/1984 | Japan . |
| 60-37011 | 2/1985 | Japan . |
| 60-123718 | 7/1985 | Japan . |
| 61-211800 | 9/1986 | Japan . |
| 63-139156 U | 9/1988 | Japan . |
| 64-15907 U | 1/1989 | Japan . |
| 2-216340 | 8/1990 | Japan . |
| 5-46242 | 2/1993 | Japan . |
| 07017299 | 7/1993 | Japan . |
| 6-251298 | 9/1994 | Japan . |
| 6-253311 | 9/1994 | Japan . |

*Primary Examiner*—Tan Nguyen
*Assistant Examiner*—Gertrude Arthur
*Attorney, Agent, or Firm*—Evenson, McKeown, Edwards & Lenahan, P.L.L.C.

[57] ABSTRACT

The invention provides a vehicle with a laterally mounted optical scanning device for zero-contact scanning of a lateral highway area and an evaluation unit connected thereto. The optical scanning device comprises a linear array of infrared transmitting devices located side by side and a corresponding CCD array, and the connected evaluation unit is programmed to perform time measurement, contrast measurement, and contour recognition. With this optical scanning system, a function to warn against falling asleep, an automatic lane maintenance function, a rear-area monitoring or environment monitoring function for the vehicle can be provided, with reaction to various types of lane boundaries being possible depending on the situation.

10 Claims, 6 Drawing Sheets

VEHICLE WITH OPTICAL SCANNING DEVICE FOR A LATERAL ROAD AREA

BACKGROUND AND SUMMARY OF THE INVENTION

The invention relates to a vehicle with a laterally mounted optical scanning device for zero-contact scanning of a lateral road area, with an evaluation unit connected thereto.

Zero-contact scanning systems of this generic type are already known in many forms and serve primarily to detect obstacles, give distance warnings, monitor rear areas, and/or detect road markings. Such systems are used, for example, for automatically keeping the vehicle in its lane or as a warning against falling asleep. In the latter case, upon detecting an imminent departure of the vehicle from the lane, the system generates an optical, acoustic, and/or haptic warning signal.

Thus U.S. Pat. No. 4,970,653, for example, discloses a vehicle with an optical scanning system that comprises a conventional CCD camera that scans the area ahead of the vehicle, i.e. the current lane including the lane markings on either side. An evaluation unit connected thereto, which contains an image processing computer, evaluates the image to determine the positions of the lateral lane markings as well as any obstacles in the lane, in the near vicinity in front of the vehicle, and generates corresponding warning signals if an obstacle is detected or the vehicle is about to cross a lane marking. The lane marking recognition function can also be used to limit obstacle recognition to the area between the markings of the lane occupied by the vehicle or to keep the vehicle automatically in the current lane.

German patent document DE-OS 33 00 086 A1 teaches equipping the anterior lateral area of a motor vehicle with an optical scanning device in which photosensitive sensors scan the road area directly beneath them, which is illuminated by a light source mounted on the vehicle and shining downward, for example. To warn the driver of uncontrolled driving, this known device delivers a warning signal when the vehicle crosses a lateral boundary marking in the lane occupied by the vehicle and therefore when the optical scanning device detects such a boundary marking.

German patent document DE-OS 38 27 729 A1 discloses a collision warning system for motor vehicles which comprises a distance measuring device for zero-contact detection of distance and position of an obstacle in the area traversed by the vehicle and, on detecting a danger of collision, produces an acoustic and/or optical warning signal. The collision warning device for example includes scanners mounted on the front right and rear left corners of the vehicle, with each scanner comprising an ultrasonic sensing unit and an infrared sensing unit. The ultrasonic sensing units each cover an angle range of 270° and measures distance using the pulse-echo method. The infrared sensing units each generate a narrow infrared beam which is pivoted stepwise through the corresponding 270° angle range to detect obstacles.

The object of the present invention is to provide a vehicle mounted system of the type described above in which the design of the optical scanning device permits reliable scanning of a lateral lane area for various functions such as warning against falling asleep and automatically staying in a lane, as well as a system reaction that is suitable for the type of lane marking and/or boundary that exists, in the form of a warning signal, for example.

This goal is achieved by the vehicle mounted scanner system according to the invention, which incorporates as an optical scanning device, a linear array of infrared transmitting elements, with an associated CCD array. An evaluation unit connected to the optical scanning device is designed for elapsed time measurement as well as contrast determination and contour recognition. This system scans the surface of the lane to detect any existing lane boundary. The running time and contrast determination permit recognition of lateral lane markings, and determination of the distance of the vehicle therefrom in a manner described hereinafter. This system can therefore warn against falling asleep or against an imminent crossing of a lateral lane marking. It also constitutes the basis for a system for automatically staying in a lane, by which the vehicle can be kept automatically in a given lane.

An especially characteristic feature of the optical scanning system is that it also permits contour recognition by means of the individual infrared transmitting elements that are arranged in a linear array, infrared LEDs for example. This means that the system can recognize the type of lateral lane boundary and can distinguish whether it is a line marking separating an adjacent travel or breakdown lane, a curb, or an adjacent grassy area in the absence of a fixed lane boundary, etc.

The capability of contour recognition makes it possible, when there is a risk of crossing a lane boundary, to select the warning time as a function of the type of lane boundary recognized. In this manner, if the vehicle is drifting out of the lane, it is possible to give the driver sufficient time and space to return the vehicle safely to the lane. The scanning device can be arranged to monitor a lateral stripe which extends above the level of a lane stripe marking in order to detect the type of lane boundary on the outside.

Based the results of the travel time and contrast measurement, as well as contour recognition, obstacle recognition of fixed or movable obstacles in the vicinity of the vehicle can also be performed and used profitably, especially in commercial vehicles which generally have large blind spots for the driver in the immediate vicinity of the vehicle.

In a first embodiment of the invention, the additional measurement of the vehicle's transverse speed offers an especially advantageous warning system against the driver's falling asleep, with a warning signal being delivered immediately prior to the vehicle's drifting out of the lane as a function of the transverse speed of said vehicle, the longitudinal speed of the vehicle, and optionally also of the type of lane boundary detected. Triggering of the warning can then be better adapted to the individual situation than in systems in which the warning is triggered only when the distance from the lane marking is detected.

In another embodiment of the invention, imminent crossing of a lateral lane marking is monitored on both sides, and an acoustic warning is emitted on the side of the vehicle to which the vehicle is drifting. The acoustic warning can consist for example of the sound of a rumble strip, which indicates acoustically to the driver that he is crossing a lane marking studded with bumps, or a corrugated strip.

According to another embodiment, upon demand from the driver, the vehicle can be kept automatically in a given lane. For this purpose, the optical scanning system that detects the lateral lane markings has its evaluation unit coupled to a device that regulates the distance of the vehicle from one or both lateral lane markings according to preset values, by corresponding automatic steering intervention. This automatic lane-maintenance function can be activated and deactivated by the driver in a manner similar to that known for example from a conventional cruise control device for controlling vehicle speed.

Yet another advantageous embodiment ensures that the automatic lane maintenance function can be activated only when a suitable driving situation exists, for example only when there are lane markings that can be recognized sufficiently reliably. Since it is advisable to deactivate the distance-regulating device when a driver's steering intervention is recognized, a passing maneuver is recognized, or when brake activation is recognized, priority may automatically be given to these driver actions.

A further improvement, permits additional performance of a rear-area and/or environment monitoring function by the optical scanning devices mounted on both sides and having infrared transmitting elements connected side by side, possibly in connection with additional scanning units mounted on the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
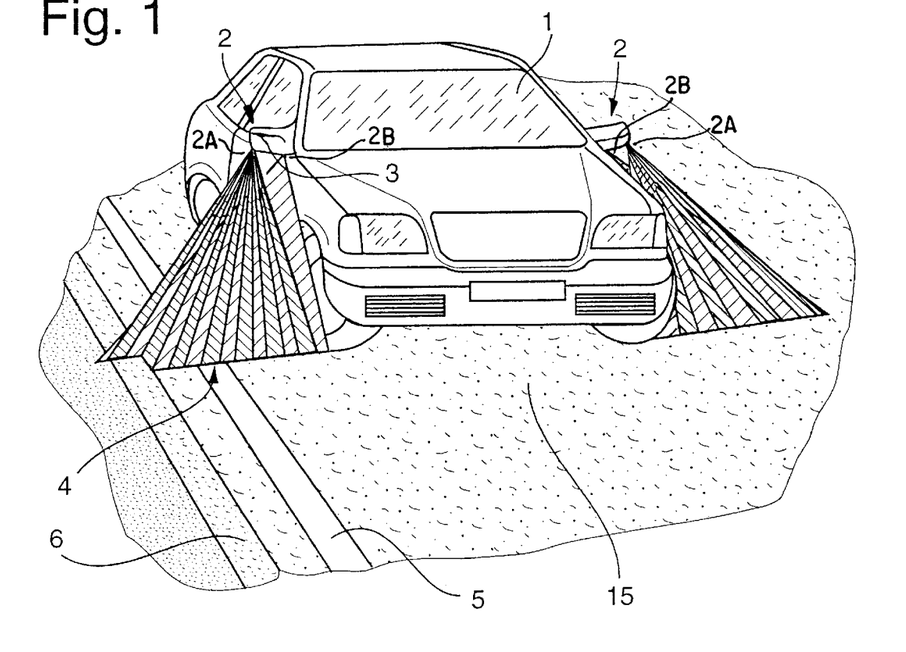
FIG. 1 is a perspective view of a motor vehicle with an infrared scanning device mounted in an outside mirror in accordance with an embodiment of the invention.

The automobile 1 shown in FIG. 1 is equipped with an optical scanning device 2 integrated in the right-hand outside mirror 3. The scanning device contains a uniform grid of several infrared LEDs 2A as well as an associated CCD array 2B, as shown symbolically by the dark and light radiation and scanning areas extending out from right-hand outside mirror 3. An identical scanning device is mounted in the left-hand outside mirror 3 of the vehicle.

A lateral strip of highway 4 approximately 0.75 m wide is irradiated by the infrared LEDs 2A. The CCD array 2B has a detection area with a lateral width of about 1 m, which contains the strip 4 irradiated with infrared light. Optical scanning device 2 is coupled to an evaluation unit (not shown in FIG. 1) to form an infrared scanning system which, because of multibeam infrared light scanning, makes it possible to measure running travel time as well as contrast, and to detect the contour of the edge of the road using the triangulation principle. Thus in the case of FIG. 1 for example the white lane marking 5, delimiting the lane 15 in which vehicle 1 is located on the right, can be detected by this scanning system. By contrast measurement it is also possible to distinguish white and yellow lane markings from one another.

Figure 6:
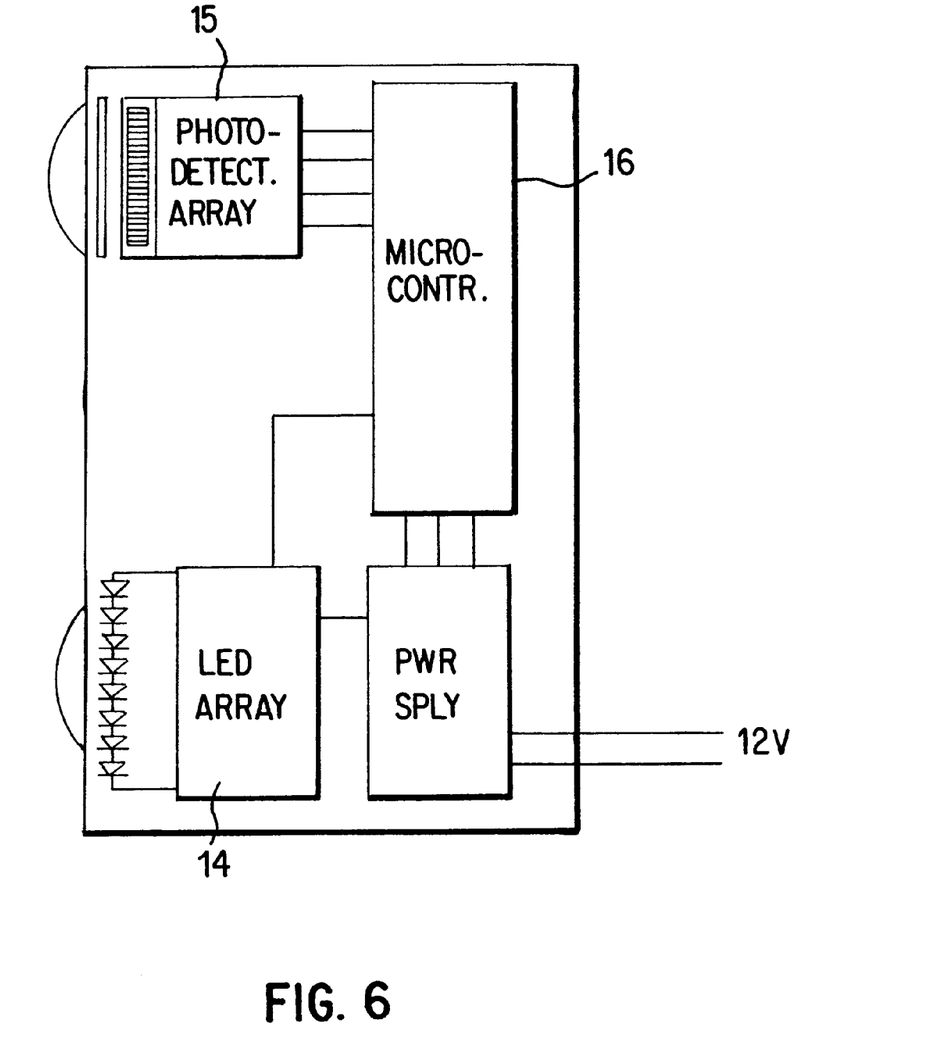
FIG. 6 shows a scanning arrangement of the type used in the invention.

FIG. 6 is a block diagram which shows the scanning arrangement described above. The array of light emitting diodes (LEDs) 14 illuminate an area next to the vehicle, at least 75 by 4 cm in size, with near-infrared light (880 nanometer wavelength). This illuminated area reflects the infrared light back to a linear charge coupled device (CCD) imaging array 15, with 64 pixels. (The 64 pixels in the CCD array correspond to a spatial resolution of approximately 12 mm, given that the length of the illuminated area is approximately 75 cm.) The line intensity information produced by the CCD is processed by a microcomputer 16 to yield the distance measurement to the white line marking the edge of the lane. The processing consists of finding the (possibly present) significant intensity peak closest to the vehicle.

Two sensing modes are possible. These are 1) a pure intensity (reflectivity) measurement, and 2) a distance measurement based on triangulation. The intensity measurement activates the LEDs 14 simultaneously, so that the illuminated area is essentially imaged by the CCD array 15. The distance measurement activates the LEDs 14 sequentially, so that only one spot on the illuminated area is reflecting back to the CCD array 15. Each LED then gives a distance measurement to the spot it illuminates. This set of distance measurements gives a reconstruction of the height profile of the illuminated area, which is useful for recognizing a curb or other objects at the roadway's edge.

Figure 7:
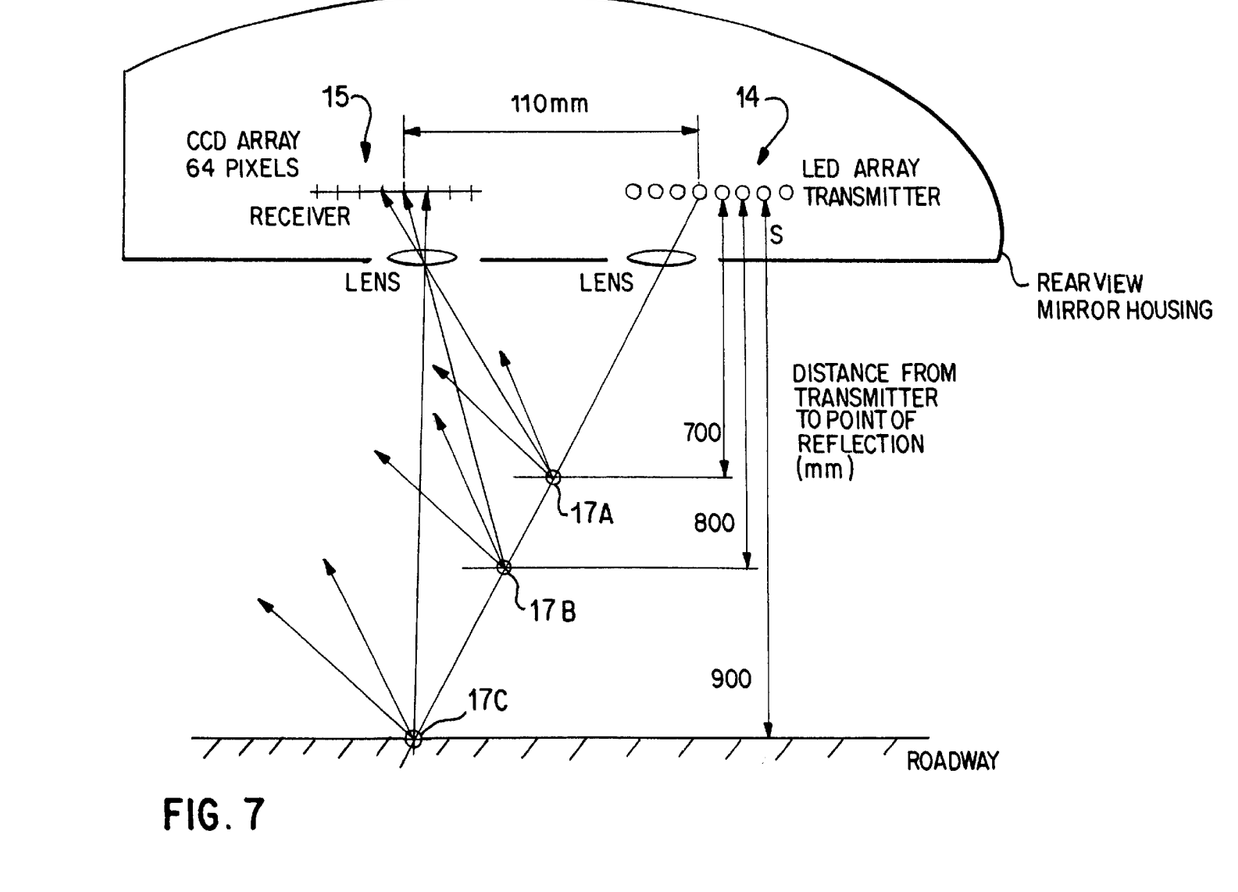
FIG. 7 is a diagram which shows distance measurement by triangulation.

In addition, the scanning system can recognize the geometric contour of the scanned area of highway 4 from the scanning signals, by means of the triangulation principle, as shown in FIG. 7. In the triangulation principle a light spot (17A, 17B or 17C, for example) is projected by a single LED in the LED array 14 onto the object whose height profile (contour) is to be measured. This light reflects diffusely and some of it returns to the sensor and is focused on the CCD array 15. A corresponding pixel in the CCD array 15 thus "sees" the illuminated spot. A spatial illuminating LED "seeing" CCD pixel pair is thus produced and trigonometry yields the distance to the object. Diffuse reflection is required for this triangulation to function. An automatic adjustment of the LED current, and hence spot brightness, guarantees a sufficiently strong CCD signal. This adjustment varies the current LED power such that the previous (neighboring LED) CCD measurement would be in the approximate center of the CCD's intensity measuring range. Variations in object reflectivity are thus accounted for.

Contours are recognized by repetition of the triangulation described above. The repeated triangulation is achieved by sequentially turning on one LED after another (scanning). The 8 LEDs then produced 8 (x,y) coordinate paris, which are assumed to be linearly connected by line segments, thus giving a contour of the illuminated object. Scanning is done sufficiently quickly such that the motion of the vehicle produces negligible displacement.

In FIG. 1 for example an elevated curb edge 6 borders the white continuous boundary stripe marking 5 of the right-hand lane 15 of a (possibly multilane) highway on the outside. From the sensor data, the system continuously calculates the distances to lane marking 5 and curb edge 6. It also determines the transverse speed of the vehicle, and based thereon calculates the time at which vehicle 1, if it were to maintain its current driving pattern, might possibly cross lateral lane marking 5 or approach the latter to within a minimum distance.

As an example, assume that the vehicle is travelling 20 meters per second longitudinally. The vehicle's lateral speed is 0.1 meters per second, towards the land marking next to the vehicle. Beginning at 75 cm form the vehicle's side edge (corresponding to the sensor's area of illumination), the distance to the lane marking is measured. Time differentiation of the distance to the lane marking yields the vehicle's lateral speed. If one continues with the same lateral speed of 0.1 meters per second, for example, the lane marking will be reached in 7.5 seconds.

When the lane marking is reached, the system delivers an acoustic warning signal to control a warning generating device, not shown. This warning generating device includes two units mounted laterally inside the vehicle to generate a warning sound resembling that of a rumble strip over suitable loudspeakers. The sound is emitted on the side on which the vehicle threatens to cross the lane markings, so that the driver is provided this information intuitively. The rumble-strip sound suggests to the driver that he is driving on a lane marking studded with bumps or provided with a corrugated strip.

The information supplied to the system and that which is already available in the vehicle electronics concerning the vehicle's longitudinal speed and especially the type of highway boundary contour that is detected, are used to select the time at which the scanning and warning generating system operating to warn against falling asleep informs the driver that vehicle 1 is drifting out of lane 15. Based on the system's ability to recognize contours, it is possible for it to determine by appropriate evaluation of the sensor data, the nature of an area bordering the outside of a lateral lane marking, and thus to determine in particular whether it is possible to drive on it. That is, the system can determine whether the adjoining area is another travel lane, a breakdown lane or a highway boundary marked by a curb edge 6, as in the case of FIG. 1, or an unpaved road boundary with a grass strip. The warning time must then be selected by the system depending on the nature of this external monitored highway area so that the driver has sufficient time and space in a given situation to keep vehicle 1 safely on highway 15 or to return it thereto. Thus in interstate and state highways with a breakdown lane for example the warning can be given significantly later than on roads without a breakdown lane.

Figure 2:
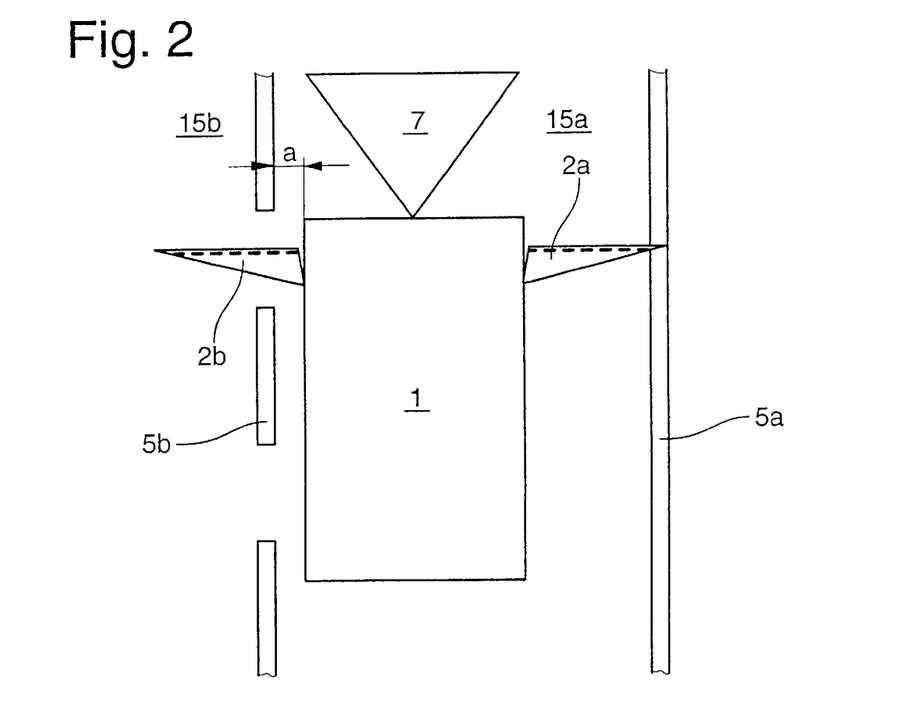
FIG. 2 is a schematic top view of a vehicle with infrared scanning devices on both sides to illustrate an automatic lane maintenance function.
Figure 3:
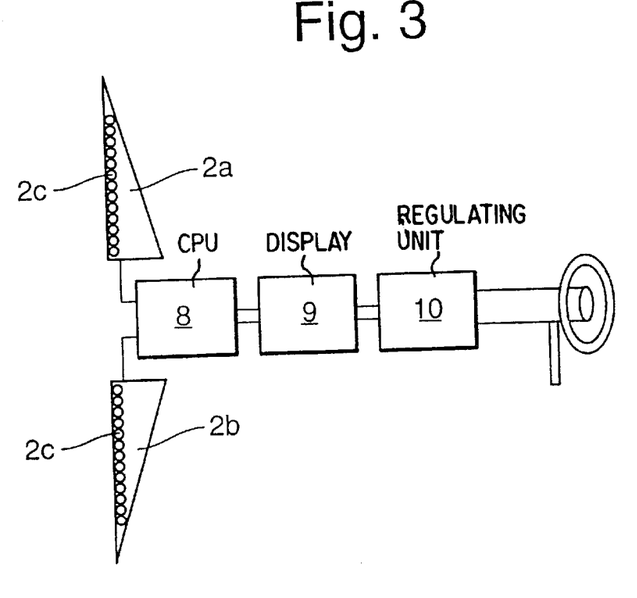
FIG. 3 is a schematic diagram of the system for automatic lane maintenance for the vehicle in FIG. 2.

In another application, the infrared scanning system described above is used as a sensor system for a device for automatic lane maintenance, as shown in greater detail in FIGS. 2 and 3. Vehicle 1, in addition to the two infrared scanning devices 2 shown schematically, which are integrated into the outside mirrors of the vehicle (each having a row of infrared LEDs 2A and a corresponding CCD array 2B), also has a scanning warning system 7 that is indicated only schematically in FIG. 2 with its detection range and is of conventional design. Vehicle 1 in FIG. 2 is in a lane 15a which is bounded on the right by a continuous lane marking 5a that borders the highway and on the left by a broken lane marking 5b that separates lane 15a occupied by the vehicle from another lane 15b adjoining on the left. The automatic lane maintenance system is designed as a lateral spacing regulating device that can also be termed an electronic tracking system.

This lateral spacing regulation regulates the distance of vehicle 1 from a lateral lane marking (in the case of FIG. 2 left-hand lane marking 5b) by a value (a) that can be preset by the driver. It informs the driver how and at what distance his vehicle 1 is approaching the right-hand marking 5a or left-hand marking 5b and, when activated on demand by the driver, guides vehicle 1 automatically at the desired set distance (a) from the respective marking 5b. This regulating philosophy of lateral spacing regulation corresponds to that of conventional cruise control regulation for maintaining a desired vehicle speed, in that the regulation can be activated only by the user, but does not free him of his obligation to be alert. In addition, the application range of lateral spacing regulation is similar to that of a cruise control, namely for the most part interstate highways and other kinds of well-constructed main roads, with easily detectable lane markings.

In order for such a combination of lateral spacing regulation and intelligent cruise control regulation that includes a distance warning or distance regulation at the front of the vehicle to be practical, vehicle 1 has a distance warning system 7 at the front as part of a cruise control regulation that is otherwise of no further interest here. The lateral spacing regulation informs the driver (depending on the situation), when it (and therefore automatic lane maintenance) can become active, and steer the vehicle 1 automatically; a corresponding release unit, not shown, is provided for regulation. For example, the system does not permit activation of lateral spacing regulation as long as the speed of the vehicle is less than 50 km/h or when no sufficiently reliably detectable lane markings are available. Blocking of spacing regulation below the above mentioned speed automatically means that spacing regulation can be activated only outside urban areas. When spacing regulating is activated, the driver can then decide whether regulation should apply to the right or left lane marking and at what distance. Even when spacing regulation is shut off, the function of warning against falling asleep continues to be active, so that the system guarantees a smooth transition between the activities of the driver and those of the system, that cannot be perceived by the driver. As in the case of an intelligent cruise control, the driver can interrupt the spacing regulation function at any time. The lateral spacing regulation is also always deactivated as soon as the driver overtakes another vehicle or performs a steering maneuver, begins a passing maneuver, or operates the brakes.

FIG. 3 is a schematic depiction of the automatic lane maintenance system according to the invention. A computer 8 is connected as an evaluation unit in the optical scanning system with the two infrared scanning devices 2 integrated into the vehicle's outside mirrors. The computer 8 transmits data on the respective distances from the lateral lane markings to a function display unit 9 connected thereto, which informs the driver about the position of the vehicle relative to the lane markings and also whether the situation at the moment permits active operation of spacing regulation for automatic lane maintenance. The function display unit 9 has a regulating device 10 connected to it that performs space-regulating interventions in the vehicle steering system, shown symbolically at the right, depending on the difference between the actual and set distances of the vehicle from the selected lane marking. The set distance is set by the driver and the actual distance is detected by scanning system 2, 8 and supplied through function display unit 9 to regulating device 10.

The distance to the lane marking is determined for this purpose by analysis of the CCD voltage profile, which corresponds to the intensity profile of the light shining onto the CCD. This information is digitized and given to the microcomputer 8 for analysis. A requirement for this lane marking recognition is the simultaneous illumination of all the LEDs in the illuminating LED array. This ensures that a linear image of the roadway and its marking is projected (simultaneously) onto the CCD array.

Figure 8:
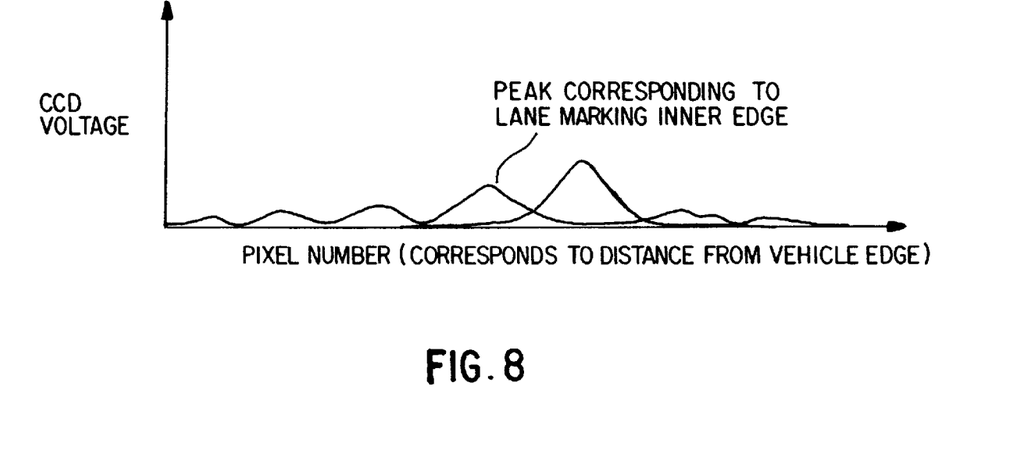
FIG. 8 is a graph of a voltage profile output by the sensor array according to the invention.

FIG. 8 shows a typical CCD voltage profile, as a function of pixel number (that is, the figure shows a linear image of the roadway). The two peaks in the voltage profile correspond to brighter areas in the image, which in turn correspond to the lane marking (since it is lighter than the roadway). The peaks 1) must have a minimum height above zero, and 2) also exceed a minimum threshold compared to the surround measurement values. Should these conditions not be met, then a lane marking is (effectively) not present. The closer peak corresponds to the close edge of the lane marking. Motion of the vehicle toward or away from the lane marking changes the location of the peaks in the image. When the peaks reach the pixel location corresponding to the vehicle edge, the driver is warned with the rumble strip noise.

Figure 4:
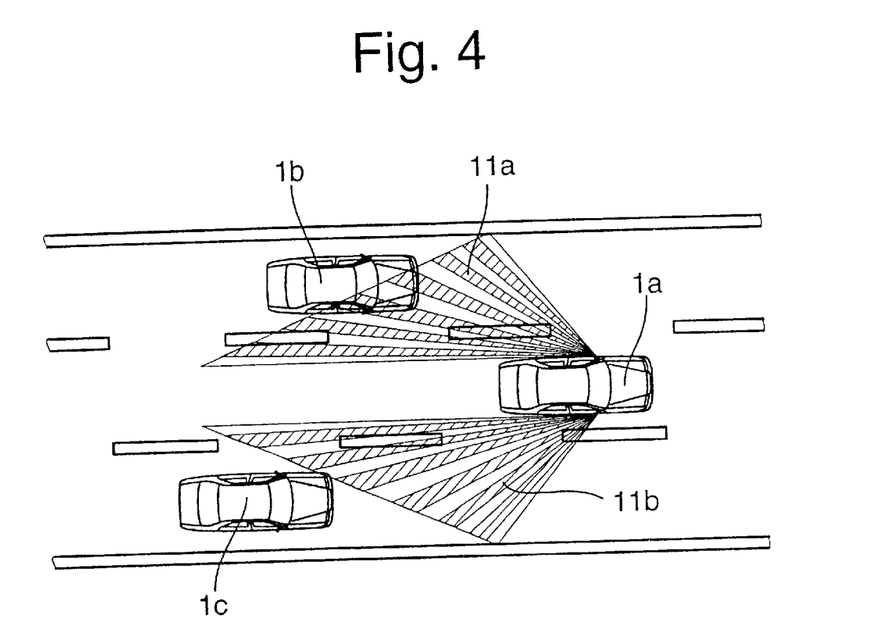
FIG. 4 is a schematic top view of a multilane highway to illustrate a rear-area monitoring function of the infrared scanning devices on both sides.

In FIG. 4, the use of multibeam infrared scanning devices mounted on both sides and integrated into the outside mirrors of a vehicle 1a is illustrated, as used for monitoring the area behind the vehicle. The optical scanning devices again each consist of a linear array of infrared transmitting elements as well as an associated CCD array. The scanning devices are designed and arranged to detect the monitoring areas 11a, 11b shown in FIG. 4, which extend outward and diagonally rearward, along the vehicle and toward the rear, and thus pick up the width of an adjoining lane, as is required for rear view monitoring. Together with an associated evaluating unit (not shown), the infrared scanning devices again permit detection of contours by means of the triangulation principle, the determination of distances by means of running time measurement, and the measurement of contrast differences. Thus the scanning system is able to detect obstacles of a rigid or mobile nature in the monitored area. In the driving situation shown in FIG. 4, vehicle 1a is in the middle lane of a three-lane highway. The left lane is occupied by another vehicle 1b that is already within detection area 11a of the left-hand scanning device, while a vehicle 1c in the right lane penetrates the right-hand scanning range 11b slightly. The example shown illustrates how the driver of vehicle 1a equipped with the optical scanning system can be made aware of other traffic and have it displayed to him, such as motor vehicles, bicyclists, and pedestrians who are located laterally and to the rear, especially in the so-called blind spot.

Figure 5:
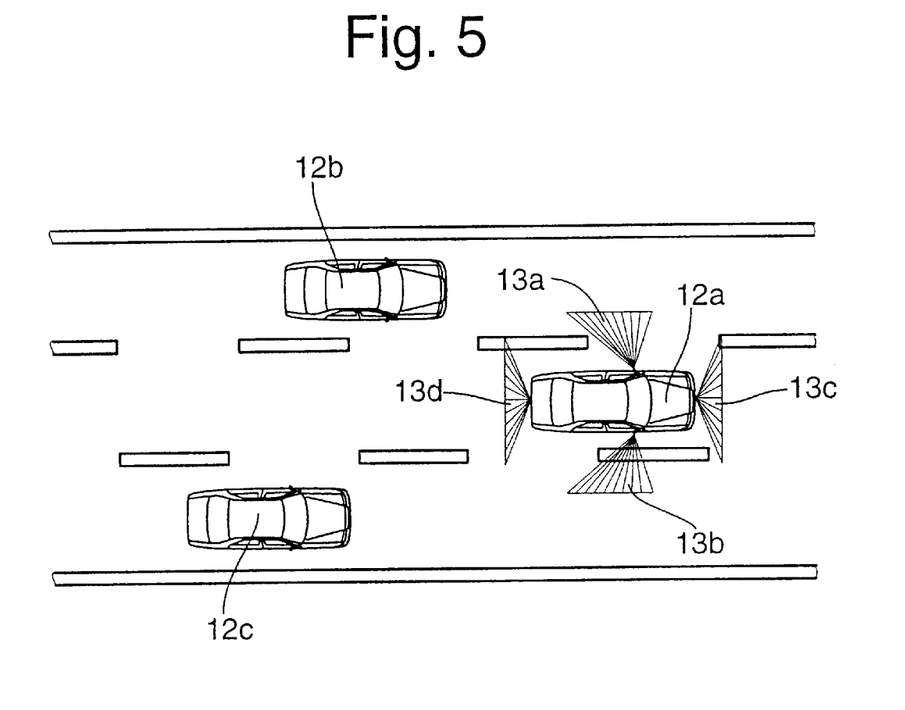
FIG. 5 is a schematic top view of a multilane highway to illustrate environment monitoring with the aid of infrared scanning devices on both sides.

Another application consists of environment monitoring as illustrated in FIG. 5. For this purpose, multibeam infrared scanning devices of the type described above are mounted on both sides at the level of the front of a vehicle 12a. Each scanning device has a plurality of infrared transmitting elements and an associated CCD array, mounted and positioned so that they can scan the indicated monitoring areas 13a, 13b, which extend outward while essentially expanding triangularly crosswise. In addition, two infrared scanning devices of the type described are arranged on the front and rear of the vehicle, so each at the center of the vehicle, that they have short monitoring areas 13c, 13d which expand sharply to about the width of a lane. Environment recognition therefore serves to monitor the immediate vicinity of the vehicle. Particularly in the case of commercial vehicles, there are large areas in the vicinity of the vehicle which the driver cannot see, especially directly in front of and behind the vehicle and in the area near the sides, particularly on the right-hand side of the vehicle. Objects farther away are not picked up, so that for example in FIG. 5, showing vehicle 12a equipped with the environment recognition system in the middle lane of a three-lane highway, two vehicles 12b, 12c which are following in the adjacent lanes are not in the environment monitoring range. In addition, obstacles in the environment area can be detected thanks to the ability of the infrared scanning systems to determine differences in contour, distance, and contrast.

The other examples illustrate the various possible applications of a multibeam infrared scanning system provided on a vehicle according to the invention. The lateral scanning devices in particular, which are integrated for example into the outside mirrors, can serve both to perform a warning function against falling asleep as well as an automatic lane maintenance function and also, at least in a supporting manner, to perform a rear area and/or environment monitoring function.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An optical scanning system for a vehicle, comprising:
   at least one laterally mounted optical scanning device for zero-contact scanning of a lateral highway area and for supplying optically sensed scanning data; and
   an evaluation unit connected to the scanning device;
   the optical scanning device comprises a linear array of infrared transmitting LEDs, as well as an associated CCD array, for scanning the surface of the highway to detect a lane boundary; and
   wherein the evaluation unit comprises means for determining running time, contrast determination, and contour recognition from the data supplied by the scanning device.

2. Vehicle according to claim 1 wherein the evaluation unit further comprises:
   means for determining vehicle spacing from a lateral lane boundary, lateral speed of the vehicle, the type of lane boundary, and a threat of imminent departure of the vehicle from a presently traveled lane; and
   means for delivering a warning signal as a function of these values, as well as the vehicle's longitudinal speed, when there is a threat of the vehicle's leaving the lane.

3. Vehicle according to claim 2 wherein:
   optical scanning devices are provided on opposite lateral sides of the vehicle, with infrared transmitting elements and an associated CCD array located side by side;
   units are provided for generating an acoustic warning at both sides of the vehicle interior; and
   said warning signal from evaluation unit is delivered in a side-specific manner to activate the warning generating unit on whose side the evaluating unit has recognized an imminent departure of vehicle from the presently traveled lane.

4. Vehicle according to claim 1 wherein said evaluation unit comprises means for determining distance of the vehicle from a lateral lane boundary, and further comprising:
   a distance regulating device coupled with the evaluation unit for regulating the distance of the vehicle from the lateral lane boundary, said regulating device being activatable and deactivatable on demand by a vehicle operator.

5. Vehicle according to claim 4 wherein:
   optical scanning devices are provided on opposite lateral sides of the vehicle, with infrared transmitting elements and an associated CCD array located side by side;
   units are provided for generating an acoustic warning at both sides of the vehicle interior; and
   said warning signal from evaluation unit is delivered in a side-specific manner to activate a warning generating unit situated on a side of the vehicle for which the evaluating unit has recognized an imminent departure of vehicle from the presently traveled lane.

6. Vehicle according to claim 4 wherein said evaluation unit further comprises a distance-regulating release unit which allows activation of the distance-regulating device only when predetermined driving situations exist.

7. Vehicle according to claim 4 wherein said distance-regulating device is deactivated upon recognizing intervention by the driver in the form of steering, beginning a passing maneuver, or brake actuation.

8. Vehicle according to claim 1 wherein said optical scanning devices with infrared transmitting elements and associated CCD arrays are so arranged on said opposite sides of said vehicle that they also scan at least one of a lateral rear area and a lateral environment of vehicle.

9. An optical scanning system for a vehicle, comprising:
   at least one laterally mounted optical scanning device for zero-contact scanning of a lateral highway area and for supplying optically sensed scanning data; and
   an evaluation unit connected to the scanning device;
   wherein the optical scanning device includes at least one scanning unit, each such scanning unit consisting of a one-dimensional linear array of infrared transmitting LEDs, and an associated linear CCD array, for scanning a laterally disposed linear segment of the surface of the highway, directed substantially outward from sides of the vehicle, to detect a lane boundary; and
   wherein the evaluation unit comprises means for determining signal running time, contrast determination, and contour recognition from the data supplied by the scanning device.

10. The scanning system according to claim 9 wherein said laterally mounted scanning device comprises first and second scanning units arranged in door mounted rear view mirror housings of right and left vehicle doors.

* * * * *